(12) United States Patent
Bruce et al.

(10) Patent No.: US 8,737,598 B2
(45) Date of Patent: May 27, 2014

(54) CUSTOMER SUPPORT CENTER WITH VIRTUAL WORLD ENHANCEMENTS

(75) Inventors: Edwin J. Bruce, Coppell, TX (US); Romelia H. Flores, Coppell, TX (US)

(73) Assignee: International Business Corporation, Armonk, NY (US)

( * ) Notice: Subject to any disclaimer, the term of this patent is extended or adjusted under 35 U.S.C. 154(b) by 989 days.

(21) Appl. No.: 12/570,229

(22) Filed: Sep. 30, 2009

(65) Prior Publication Data

US 2011/0075819 A1 Mar. 31, 2011

(51) Int. Cl.
  *H04M 3/00* (2006.01)
(52) U.S. Cl.
  USPC .................................. 379/265.09; 379/88.17
(58) Field of Classification Search
  USPC .......................................... 379/265.01–266.1
  See application file for complete search history.

(56) References Cited

U.S. PATENT DOCUMENTS

| | | | | |
|---|---|---|---|---|
| 8,014,512 | B2 * | 9/2011 | Chen et al. | 379/266.01 |
| 8,301,474 | B2 * | 10/2012 | Hartman et al. | 705/7.11 |
| 2003/0041032 | A1 | 2/2003 | Ballin et al. | |
| 2008/0139315 | A1 | 6/2008 | O'Connor et al. | |
| 2009/0051752 | A1 | 2/2009 | Lammers | |
| 2009/0063168 | A1 | 3/2009 | Finn et al. | |
| 2009/0089439 | A1 * | 4/2009 | Benco et al. | 709/228 |
| 2009/0093300 | A1 | 4/2009 | Lutnick et al. | |
| 2010/0131876 | A1 * | 5/2010 | Mcguire et al. | 715/765 |
| 2010/0162121 | A1 * | 6/2010 | Yoakum et al. | 715/727 |
| 2010/0241512 | A1 * | 9/2010 | Tirpak et al. | 705/14.49 |

OTHER PUBLICATIONS

Vijaykar et al., "Virtual Worlds as a Tool for Enterprise Services", IEEE Consumer Communications and Networking Conference, Jan. 2009, pp. 1-5, Las Vegas, USA.

* cited by examiner

*Primary Examiner* — Simon Sing
(74) *Attorney, Agent, or Firm* — Patents on Demand P.A.; Brian K. Buchheit; Scott M. Garrett (57) ABSTRACT

A customer support system enhanced with virtual world features to make the support experience more interactive and pleasant. The system includes a web user interface for web-based customers and an optional voice interface for voice-based customers, a support server and a virtual world component for enhancing the interaction between a customer and the support center. A routing server with virtual world targets route the customer to appropriate support center contacts in the virtual world. The virtual world targets include a "Greeter" avatar for greeting and prompting the customer with support-related questions. The customer is routed to a "CSR" avatar once support information is obtained. Other avatars like "Expert" avatars, "Advisor" avatars, and "Friend" avatars may also join the support session to assist the customer on specific support items, depending on the customer needs.

25 Claims, 9 Drawing Sheets

CUSTOMER SUPPORT CENTER WITH VIRTUAL WORLD ENHANCEMENTS

FIELD OF THE INVENTION

The invention relates generally to customer support centers, and more particularly, to a customer support center enhanced with the use of avatars in a virtual world.

BACKGROUND OF THE INVENTION

Customer support centers, or call centers, are commonly set up by companies and business operations to handle customer inquiries and to provide support for their products and services. A customer support center may be an area on the company's premise with a few persons who handle incoming and outgoing customer calls. For a major telemarketing operation, the support center may be a dedicated facility with a large group of salespersons, advanced computers and telecommunication equipment, where the salespersons make sales calls and receive incoming customer inquiries. A support center may also be a service area that handles customer calls concerning the repair or maintenance of the company's goods or services.

More typically, a customer support center is set up in an open workspace with customer representatives who have access to networked computers, telephones or headsets connected to a telephone switch and supervisor stations. The support center can be independently operated or networked with additional centers, often linked to a corporate computer network, including mainframes, microcomputers and LANs. Increasingly, voice and data pathways into the center are linked through a set of technologies called routing servers which work in conjunction with computer telephony integration (CTI). The CTI also interfaces with the customer support servers in addition to an enterprise's e-mail system, databases and web-based services.

Most major business enterprises use customer support centers to interact with their customers. Business applications for the support centers are virtually unlimited in the types of transactions that they can accommodate. They can support, for example, sales, including order entry and reservations; financial services, including funds transfer and stock transactions; and customer services, including technical support, repair and claims handling. Examples of businesses that use support centers include utility companies, mail order firms, and customer support for computer hardware and software products. Some businesses even service internal functions, such as help desks and sales support, through their support centers.

Early customer support centers generally used telephone-based systems for receiving customer calls. Those ranged from a single telephone line to a large multi-node telephone system. A modern support center often has a call management system for the tracking, logging and recording of call details. It may have one operator or many operators, depending on the size of the company. Most support centers today rely on an infrastructure that combines telephone switching networks, the Internet and computers to provide different support functions at various stages of a customer interaction.

In addition, the needs for handling large customer call volumes, improved efficiency and lower cost have forced business enterprises to gradually move away from people intensive service models to more automated technology based models in their support centers. A technology based center typically includes a telephone network interface for receiving incoming customer calls, a routing server to route the calls to the appropriate functions in the center, and CTI software to provide support representatives with information about issues being handled.

Although technology based support centers are less expensive to operate, they suffer a common disadvantage in appearing impersonal to customers, and generally receive lower ratings for customer satisfaction. Customers often prefer to interact with an actual support person when having a product or service problem, rather than responding to voice directions on a telephone or selecting user options on a computer screen.

More advanced support centers have attempted to improve the level of customer attention by employing interactive web applications like instant messaging to provide a more responsive and individual interaction with a customer. Although this is an improvement over traditional telephone recording and computer menu driven customer interfaces, it still lacks the "face-to-face" feeling that most customers prefer when they contact a customer support center.

From the foregoing it is appreciated that there exists a need for a customer support center that augments current practices.

SUMMARY OF THE INVENTION

The present invention describes a customer support system enhanced with virtual world features to make the support process more interactive and pleasant. The system includes a web user interface for interacting with a customer through the web, a customer support server which enables customer support representatives to effectively support customers through their own web user interfaces, and a virtual world component leveraged by the customer support representatives for enhancing interactions between customers and themselves.

The customer support system further includes a routing server enhanced with virtual world targets to connect customers with appropriate support contacts in the virtual world. The virtual world targets typically include a "Greeter" avatar for greeting the customer and prompting him/her with support-related questions. The "Greeter" avatar leverages text-to-speech technology and prompting scripts to "speak virtually" and facilitate interactions with the customer. In addition, speech-to-text technology is leveraged to recognize customer avatar responses, and to trigger actions similar to those provided by a voice response system. Once the support needs of a customer are determined, the customer may be routed to a customer support representative (CSR) avatar, who interacts with the customer in the corresponding human CSR role. Other avatars like "Expert" avatars, "Advisor" avatars, and "Friend" avatars may also join a given support session to assist the customer for specific issues, depending on the customer's situation, or even to just jointly experience the session with the customer.

The customer support system of the invention might also have a voice recognition component for accepting voice input from a customer, along with a voice gateway for receiving customer support calls using telephones and other voice based devices. The voice gateway can communicate with a public switched telephone network to allow customer support interactions by telephone. A call management component manages incoming customer calls.

A CTI component integrates the customer telephone call path into the support computer system of the customer support center. In addition, integration with various enterprise systems such as knowledge databases can be included to provide customer support information, like common inquiries and their corresponding answers. Such support information may be shareable with a customer during a support session.

In another aspect of the invention, a method is described for providing support to customers in a virtual world using a support system enhanced with virtual world features. The method includes interactions with a customer through a web user interface coupled to a support server, along with enhancement of those interactions using features provided by a virtual world component.

In yet another aspect of the invention, a computer program product for use with a computer for providing customer support in a virtual world is described. The product includes computer code operable to interact with a customer through a web user interface, and to enhance customer interactions with virtual world features. Those features are provided by a virtual world component coupled to the support server.

The invention enhances voice interactions by enabling the leverage of text-to-speech and speech-to-text technologies within the virtual world. Such enhancements within the invention are provided by a "voice response virtual world interaction component". The invention also enhances the aforementioned routing server with the ability to target various virtual world avatars such as the "Greeters", "Experts", "Advisors", Friends" and others for interactions with customers.

The details of the present invention, both as to its structure and operation, are described below in the Detailed Description section in reference to the accompanying drawings, in which like reference numerals refer to like parts. This Summary is intended to identify key features of the claimed subject matter, but it is not intended to be used to limit the scope of the claimed subject matter.

DETAILED DESCRIPTION OF THE INVENTION

The invention relates generally to a customer support center enhanced with virtual world features and a method for providing customer support through those features. More specifically, the present invention provides a customer support center and a method to provide support that uses avatars in a virtual world to make the interactions between a customer and the support center more interactive and pleasant.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment of any combination of software and hardware components. Furthermore, the present invention may take the form of a computer program product embodied in any tangible medium of expression having computer-usable program code embodied in the medium.

Any combination of one or more computer usable or computer readable media may be utilized. The computer-usable or computer-readable media may be, for example but not limited to, electronic, magnetic, optical, electromagnetic, infrared, or semiconductor system, apparatus, device, or propagation medium. An example of a computer-readable medium is a hard disk drive.

Referring now to the drawings, in which like numerals represent like elements, aspects of the present invention and exemplary operating environments will be described.

Customer Support Center

Figure 1:
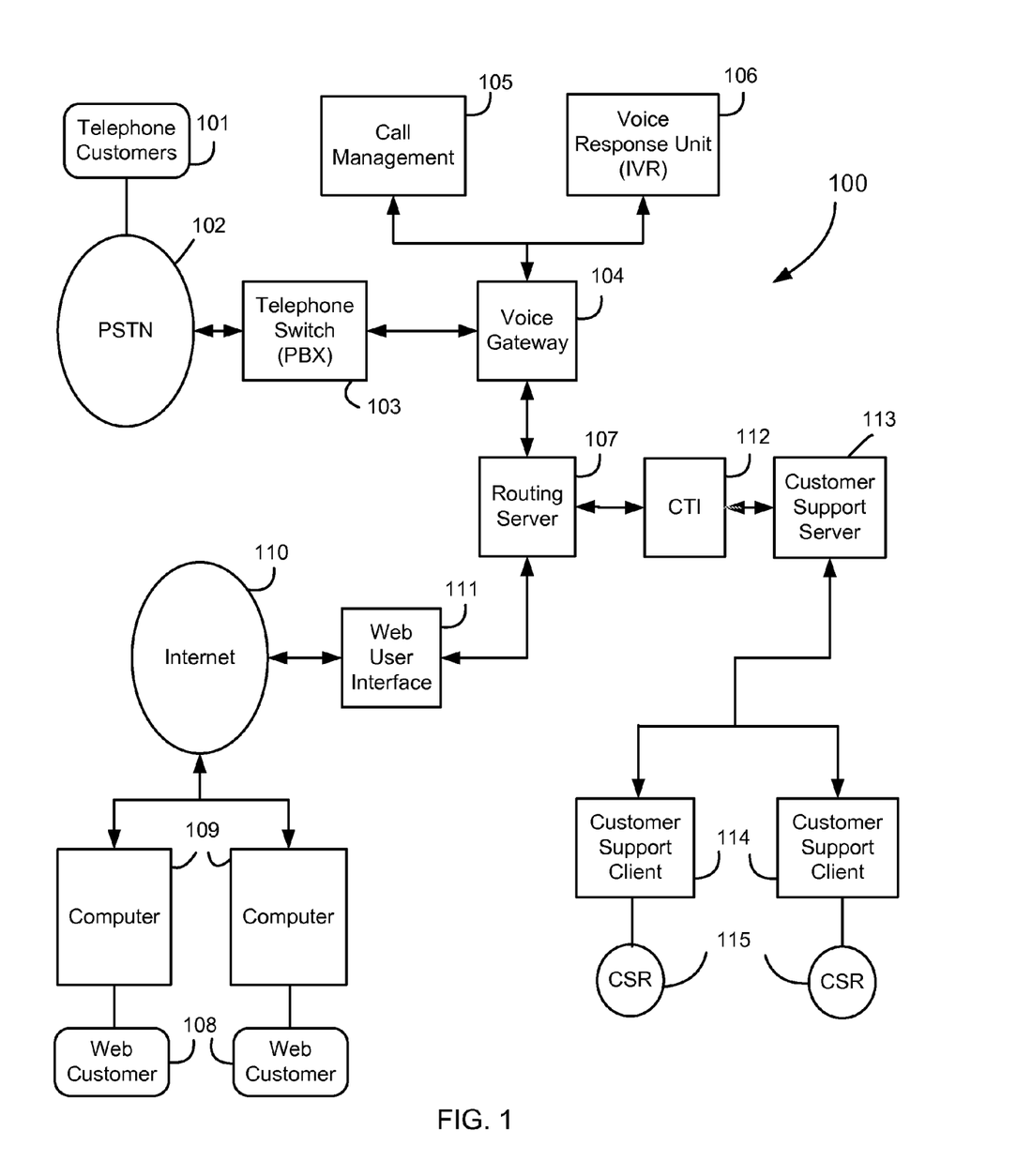
FIG. 1 is a block diagram illustrating the components of a typical customer support center that can handle both telephone and web customers.

FIG. 1 is a block diagram depicting a representative customer support center 100 which might include an exemplary embodiment of the present invention. The support center 100 includes a telephone switch 103 for receiving incoming telephone calls from customers 101 through a public switched telephone network (PSTN) 102. The switch 103 establishes, terminates or changes connections between telephone lines, and is typically a PBX telephone switch residing on the same premises as the support center 100. A voice gateway 104 is connected to the telephone switch 103 for receiving and processing incoming calls. In addition, the support center 100 has a call management component 105 for managing details of customer calls.

The support center 100 further includes a web user interface 111 for providing support to customers 108 who contact the support center 100 using the Internet. The customers 108 connect to the support center 100 through computers 109. The computers 109 include necessary network interfaces for connecting to the Internet 110. The support center 100 accommodates both telephone and Internet customers using a computer telephony integration (CTI) component 112. Other appropriate integrators, similar to the CTI component 112, might be provided to support customers who contact the support center 100 through other communication channels, such as radio-based devices.

A routing server 107, coupled to the CTI component 112, routes incoming customer calls to the appropriate center support personnel for assistance. A customer support server 113, coupled to the routing server 107, provides necessary support functions to the customers 101 and 108. Typically, the support center 100 has one or more customer support representatives (CSR) 115 who are available to render live assistance to the customers 101 and 108 when needed. The customer support representatives 115 interact with the customers 101 and 108 through the support center client computers 114, which are connected to the customer support server 113.

Virtual World

A virtual world is an interactive computer-simulated representation of a real-world environment or a fanciful non-existent environment accessed by multiple users through an online interface. The users are sometimes referred to as participants. Examples of virtual world environments include virtual social communities, multiplayer online games and virtual financial business offices. Users inhabit and interact in a virtual world via avatars, which are the users' virtual or symbolic representations of themselves. These representations can be in the form of three-dimensional models, two-dimensional icons, text constructs, user names, etc. Within a virtual world, avatars may interact with other avatars as well as with virtual objects. Virtual objects may include virtual representations of real world objects, such as offices, catalogs and merchandise, as well as representations of fanciful creations that do not exist in real life. Although there are many different types of virtual worlds, there are several features many virtual worlds generally have in common. These features include, for example, multiple users, visual depiction in 2D or 3D environments, and interactivity.

In general, any real world environment may be rendered in a virtual world. Activities that would normally occur within a real world environment may also be rendered within the virtual world. For example, the offering of merchandise for sale in a retail store or the financial transactions that a customer typically receives at a bank's service window may all be rendered in a virtual world.

In embodiments, such virtual world activities may be rendered using one or more avatars, which are configured to represent customers or sales assistants involved in the activities. The avatars may be rendered in various sizes, species, and/or colors. By undertaking desired activities using avatars, users can quickly and easily visualize and monitor the progress of those activities.

Figure 2:
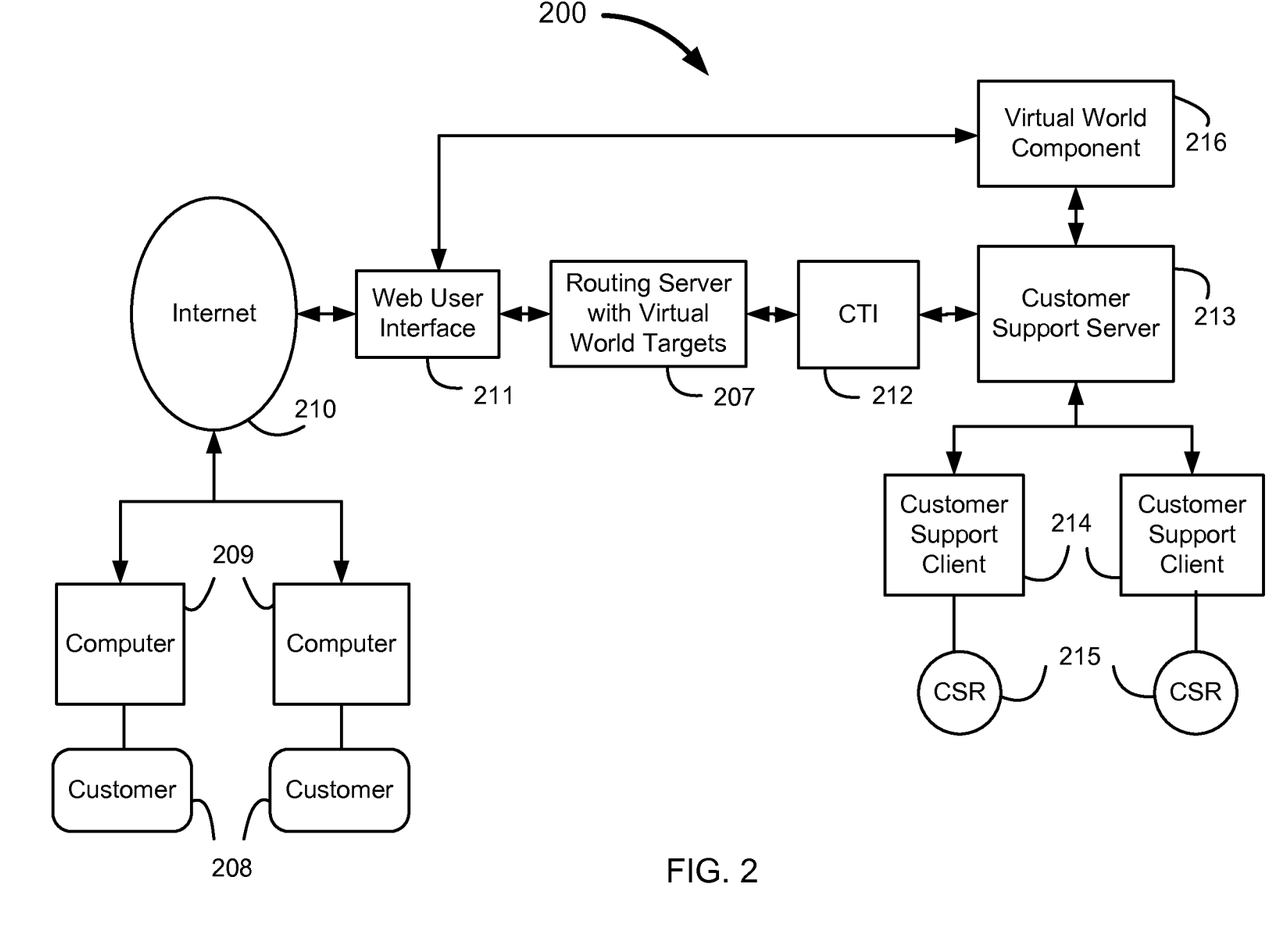
FIG. 2 is a block diagram illustrating the components of an exemplary embodiment of a customer center for supporting web customers in accordance with the invention.

FIG. 2 is a block diagram showing an embodiment of a customer support center 200 enhanced with virtual world features according to the invention. A customer 208 communicates with the support center 200 through a customer computer 209. The customer computer 209 includes a network interface such as an Ethernet network adapter for connecting to the Internet 210, along with a web browser for interacting with web servers. A web user interface 211 is provided in the support center 200 to allow the customer support server 213 to interact with customers 208 using web applications and services. With the web user interface 211, a customer 208 may view a merchandise catalog, shop for goods and services, or conduct a business transaction.

The Routing Server with Virtual World Targets 207 provides the intelligent routing of customer calls to the appropriate customer support representatives (GSRs). The Routing Server is enhanced with virtual world targets such as CSR and "Expert" avatars to provide enriched support services to a customer. Further details of the virtual world features provided by the Routing Server with Virtual World Targets 207 are described below in reference to FIGS. 5-9.

In addition, virtual world features are also incorporated into the functions provided by the Customer Support Server 213 in combination with the Virtual World Component 216. For example, during a customer support session, the Virtual World Component 216 prompts the customer with options to interact with avatars with roles similar to those of the support center supervisors, technical experts, or other persons who might have a business connection with the company or customer (i.e., "friends"). More details on the enhancements provided by the Virtual World Component 216 are described below in reference to FIGS. 4-9.

The customer support center 200 typically has one or more customer support representatives (GSRs) 215 who provide line assistance to customers 208 when necessary. The CSRs 215 interact with the customers 208 using the support center client computers 214 that are connected with the support center server 213. One key aspect of the invention is to enrich customer support experiences using a virtual world and avatars. Accordingly, there might be one or more avatars associated with a live CSR 215 at the support center that could assist the customer during a support session. Whenever it is determined that a customer needs to interact with a live CSR 215, then a live CSR 215 would join the support session to provide that live assistance.

Figure 3:
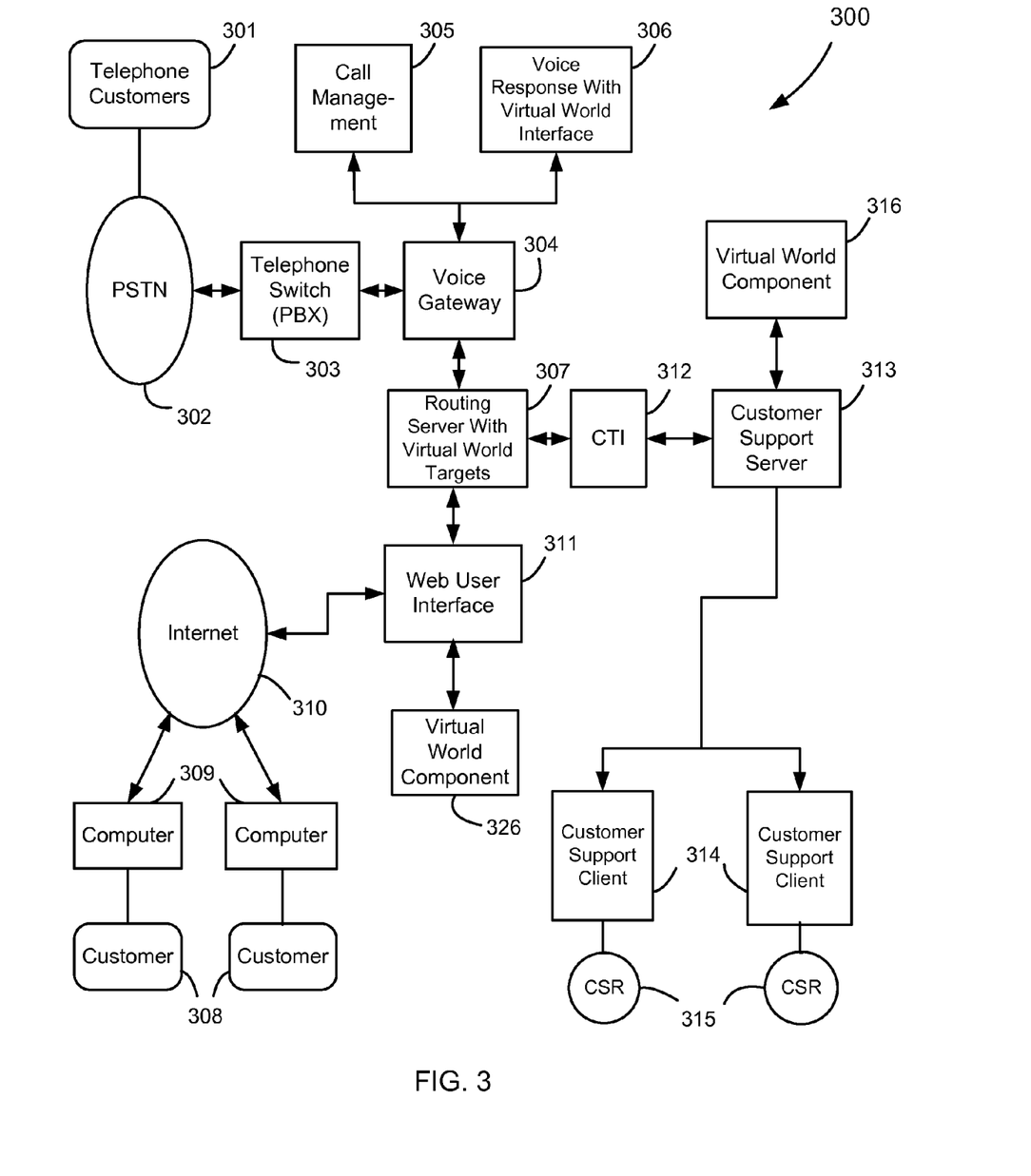
FIG. 3 is a block diagram illustrating the components of a second exemplary embodiment of a customer support center for supporting both web and telephone customers in accordance with the invention.

FIG. 3 is a block diagram representing a second embodiment of the invention in which a support center 300 includes a voice channel to provide support to customers by telephone. In addition to the web channel, which allows the customers 308 to contact the support center 300 through the Internet 310 and the web user interface 311, the customers 301 may contact the center 300 by telephone. The customers 301 reach the support center 300 through a public switched telephone network (PSTN) 302. At the support center 300, the customer telephone calls are received by a telephone switch (PBX) 303 and processed by a voice gateway 304.

A call management component 305 manages the overall distribution and handling of customer calls. The Voice Response with Virtual World Interface 306 component prompts customers with questions about themselves and support subject matter. It also performs voice recognition functions, and routes a customer call to appropriate procedures and support personnel in the center 300. The Voice Response with Virtual World Interface 306 component is enhanced with virtual world features such as a prompted script for a "Greeter" avatar. As described in reference to FIG. 2, the "Greeter" avatar is provided by the Virtual World Component 316. In addition, the Voice Response with Virtual World Interface 306 component recognizes and processes the voice interactions that the customer is having with the "Greeter" avatar and other avatars that might participate in the support session.

As previously described in reference to FIG. 1, a computer telephony integration (CTI) component 312 integrates the telephone calls from the customers 301 into the voice and computer infrastructure of the support center 300. The Internet-related components 309, 310, and 311 are similar to the components 209, 210, and 211 of FIG. 2, respectively, and have previously been described in reference to FIG. 2.

A Routing Server with Virtual World Targets 307 provides the intelligent routing of customer calls to the appropriate customer support representatives (GSRs). This Routing Server is enhanced with virtual world targets such as CSR avatars and "Expert" avatars to provide enriched support services to customers. Further details on the virtual world features provided by the Routing Server with Virtual World Targets 307 are described below in reference to FIGS. 4-9.

A Virtual World Component 316, coupled to the Customer Support Server 313, enhances the interaction between customers 301 and 308 and the support center 300 with virtual world features. Whenever live customer support is needed during a support session, a customer support representative (CSR) 315 would join the session through a customer support client 314. The customer support clients 314 are connected to the Customer Support Server 313 through the support center's computer network.

Figure 4:
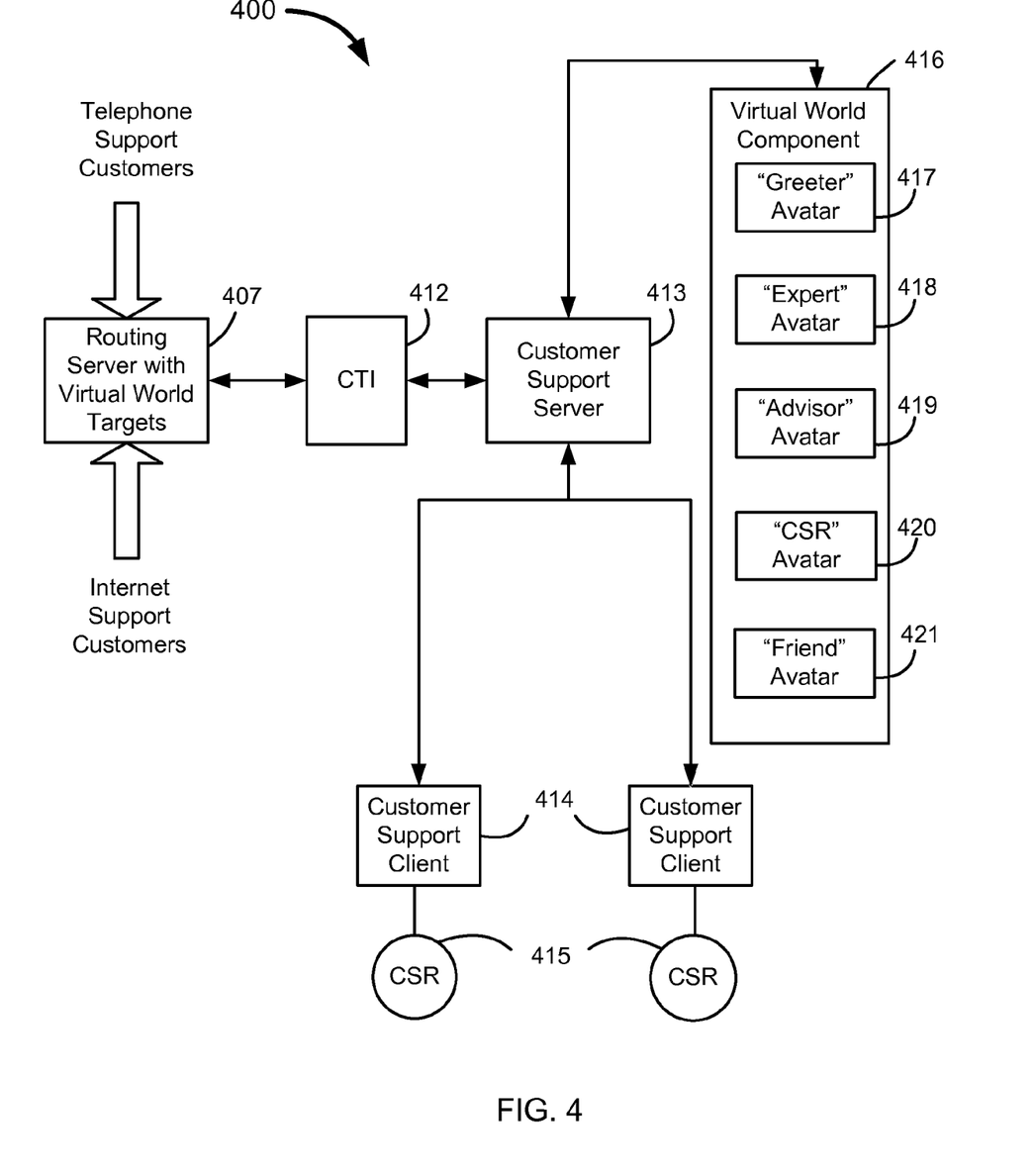
FIG. 4 is a block diagram illustrating the avatar capabilities in accordance with the invention.

FIG. 4 is a block diagram depicting some example avatars that might appear during a typical customer support session for enhancement of the support experience, depending on the customer's needs. The blocks representing the telephone and Internet interfaces, and the customers using those interfaces have been previously described and are omitted from FIG. 4 for clarity. The CTI 412, the Routing Server with Virtual World Targets 407, the Customer Support Server 413, the Customer Support Clients 414 and CSRs 415 have previously been described in reference to FIGS. 1-3. The "Greeter"

avatar 417, "Expert" avatar 418, "Advisor" avatar 419, "CSR" avatar 420 and "Friend" avatar 421 are the virtual world enhancements that might appear to interact with and assist the customer during a support session. An "Expert" avatar represents a CSR who is an expert in a particular subject. An "Advisor" avatar represents an advisor or supervisor with a higher authority in the support center. A "Friend" avatar represents a person who has an interest in the support matter being resolved. Other virtual world enhancements might include a 3D representation of the support center 400 with avatars having various support roles.

Using the virtual world functions provided by the Virtual World Component 416, the Voice Response with Virtual World Interface described in FIG. 3, and the Routing Server with Virtual World Targets 407, the Customer Support Server 413 provides a "Greeter" avatar 417 to greet a customer when the customer selects to be transported to a virtual world. The "Greeter" avatar then interacts with the customer to collect general information about the type of support that the customer needs, and directs the customer to the appropriate support representative.

As the support session progresses, if it is determined that the customer's inquiry concerns a specific subject handled by an expert in the support center 400, then an "Expert" avatar 418 would join the session to assist the customer. For example, the customer might have a question on how to install a particular software product. There may be several "Expert" avatars 418 for handling different types of support issues. In addition, the support center 400 may have other types of avatars like "Advisor" avatar 419, "CSR" avatar 420, as described earlier.

The interaction between the customer and the virtual world features are now described in reference to the flow charts in FIGS. 5-9, according to embodiments of the invention. Each block or combination of blocks in the flow charts might be implemented by computer program instructions. These computer program instructions may be run on a computer to perform the operations represented by blocks in the flow charts.

Figure 5:
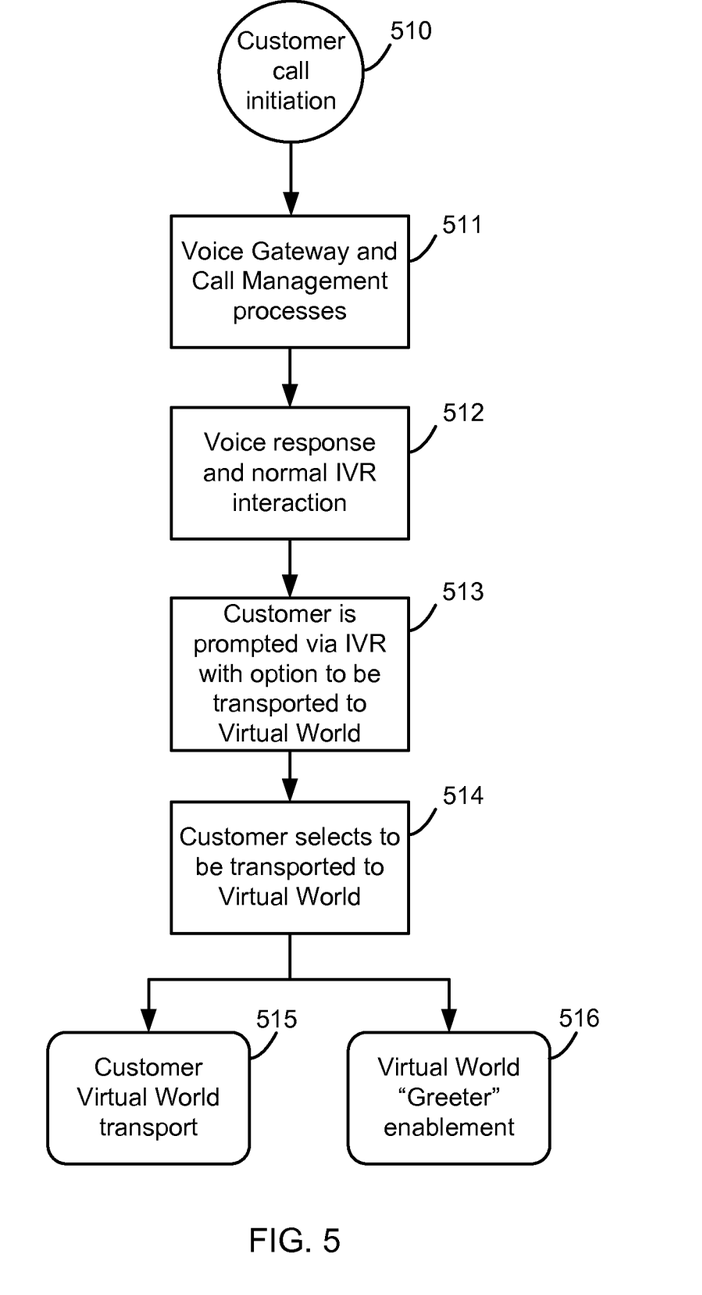
FIG. 5 is a flow chart representing a process for providing virtual enhancements to the support process for phone-based customers in accordance with aspects of the invention.

FIG. 5 is a flow chart of an exemplary process for providing virtual enhancements to support voice-based customers in accordance with the invention. At step 510, a customer contacts the support center by calling the center's support telephone number. The customer call is received by the center's Voice Gateway and processed by its Call Management component in step 511. At step 512, the center's Voice Response with Virtual World Targets component provides interactive voice response (IVR) functions to collect general information about the customer's needs in order to direct the customer to the appropriate unit within the center. Through the IVR interaction, the customer is given the option to be transported to the virtual world at step 513. In this scenario, the customer chooses to enter the virtual world at step 514. At this point, a Customer Virtual World Transport process starts at step 515 and a Virtual World "Greeter" process starts at step 516. These processes are described below in reference to FIGS. 7-9.

Figure 6:
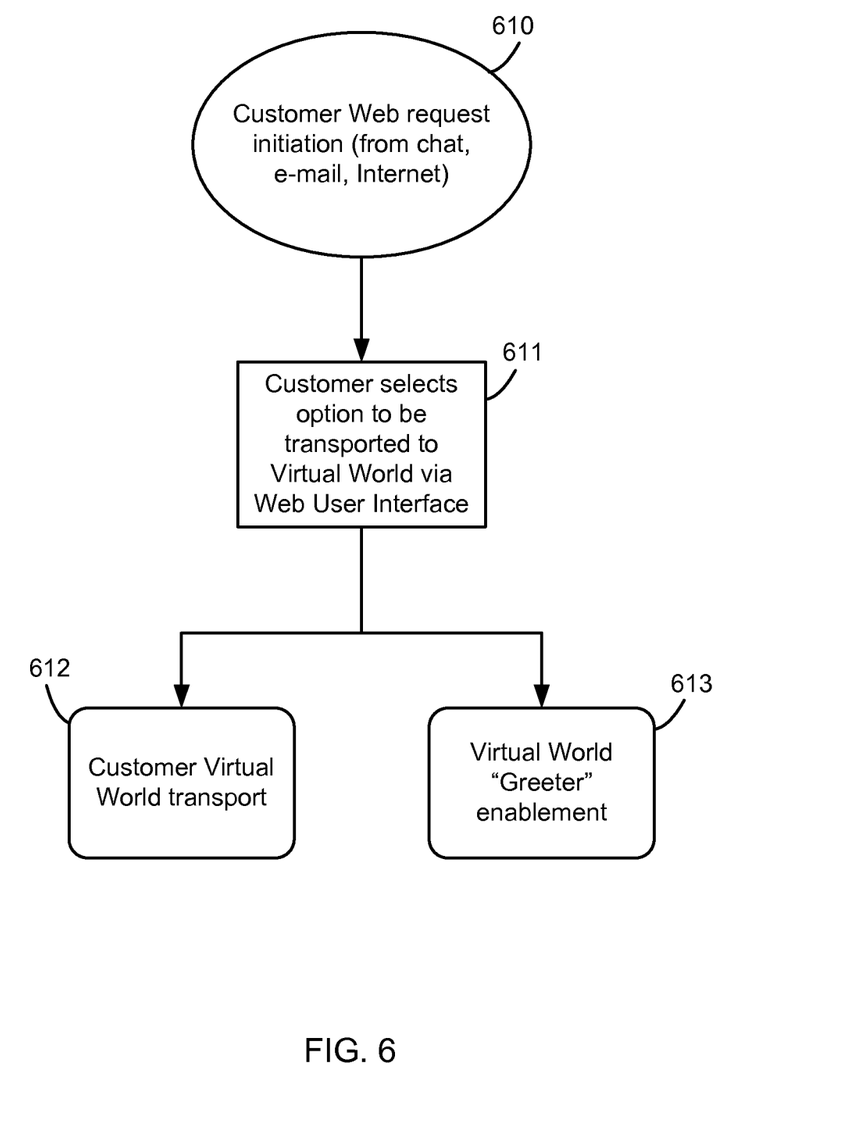
FIG. 6 is a flow chart representing a process for introducing virtual enhancements to the support process for web-based customers in accordance with aspects of the invention.

FIG. 6 is a flow chart of an exemplary process for introducing virtual enhancements to support web based customers in accordance with aspects of the invention. At step 610, the customer contacts the support center for assistance through a Web request, which might be from a chat session, via e-mail or from a Web application. The customer then selects to be transported to the virtual world through a Web User Interface at step 611. A Customer Virtual World Transport process then starts at step 612 and a Virtual World "Greeter" process starts at step 613. These processes are described below in reference to FIGS. 7-9.

Figure 7:
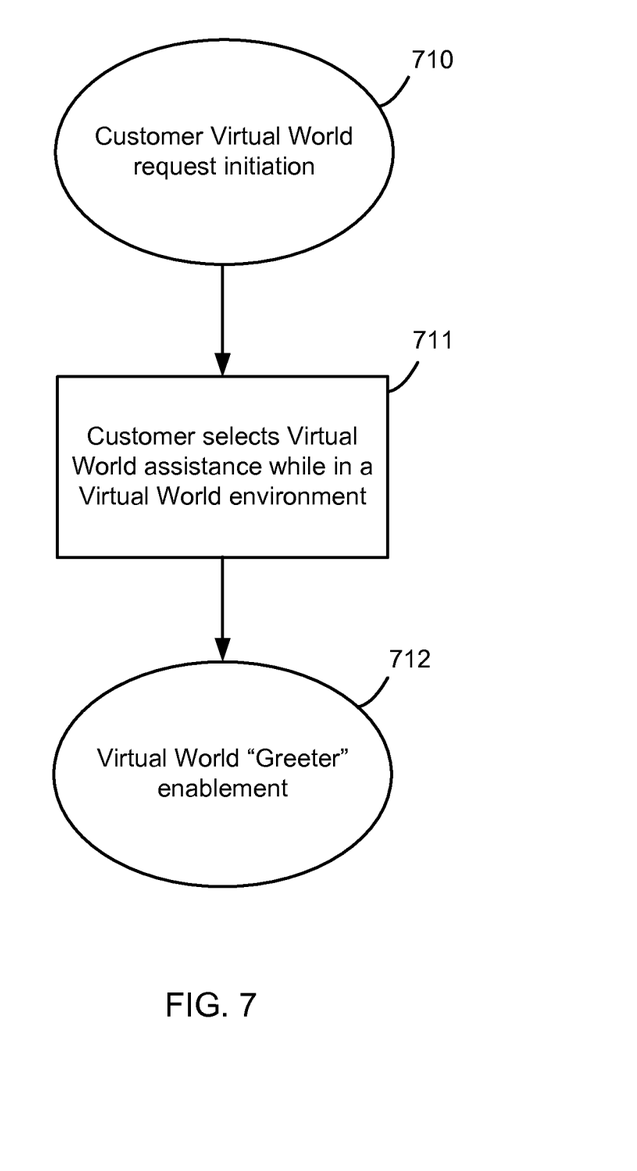
FIG. 7 is a flow chart representing a process for a customer to select customer support with virtual world enhancements while in a virtual world environment, in accordance with aspects of the invention.

FIG. 7 is a flow chart of an exemplary process for a customer to request virtual world assistance while in a virtual world environment in accordance with aspects of the invention. At step 710, the customer enters or is already in a virtual world environment. The customer chooses the option to receive assistance in the virtual world at step 711. A Virtual World "Greeter" process then starts at step 712. This process is described below in reference to FIGS. 8 and 9.

Figure 8:
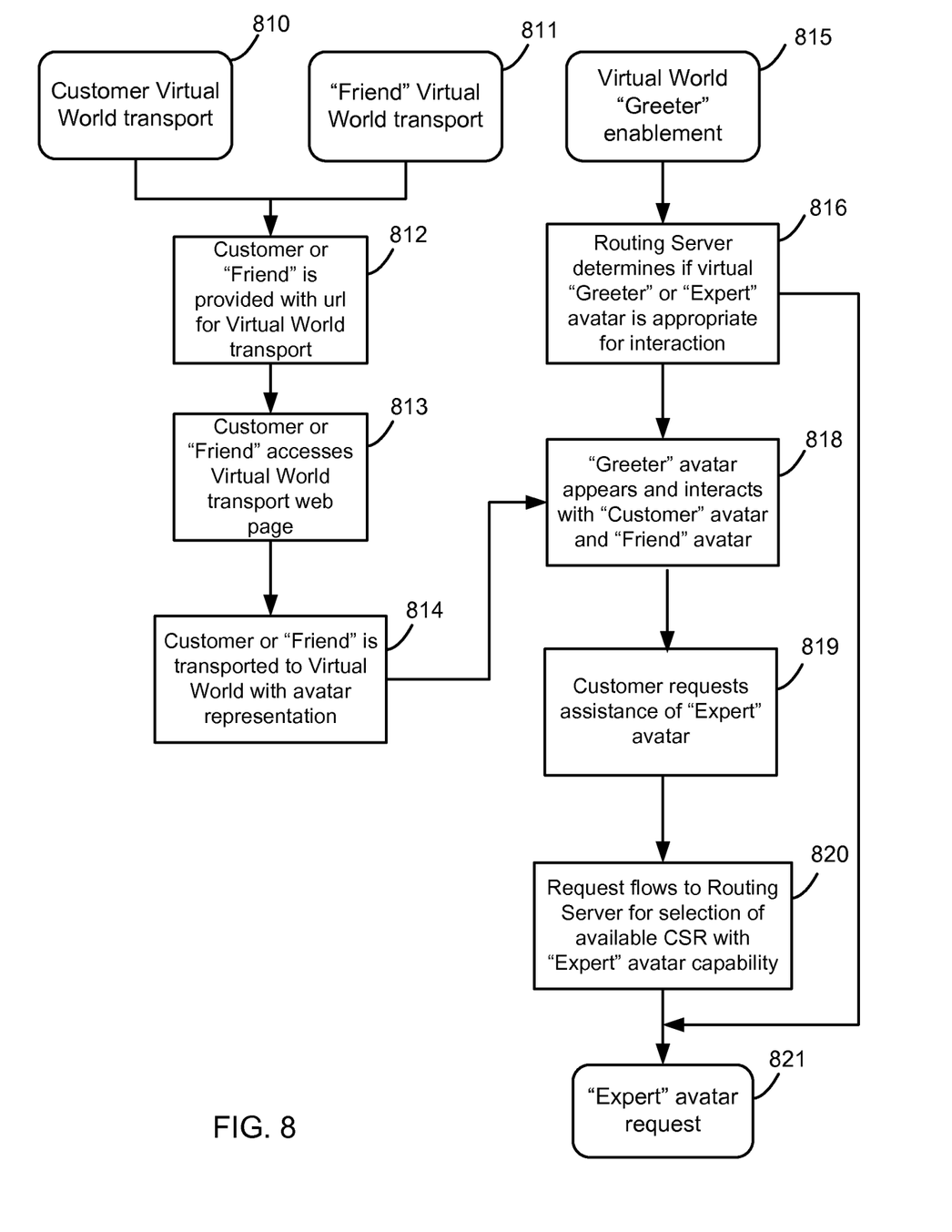
FIG. 8 is a flow chart representing subsequent flows that continue from the process of FIG. 7, in accordance with aspects of the invention.

FIG. 8 is a flow chart of an exemplary process for providing "Expert" and "Friend" avatar assistance in a virtual world, in accordance with aspects of the invention. The process starts at step 810, which continues from FIG. 5 or 6. Another person having an interest in a customer's issue(s) might also join the support process as a "friend" at step 811. At step 812, a customer or friend is provided with a URL for transport to a virtual world. The customer or the friend then accesses the Virtual World Transport web page at step 813. At step 814, the customer or the friend is transported to the virtual world, within which avatars appear to assist them with various support items. The customer and the friend are represented as "Customer" avatar and "Friend" avatar, respectively. The process continues at step 816, where the Routing Server determines whether a "Greeter" avatar or an "Expert" avatar might be appropriate for the customer at this time. The process shown in FIG. 8 might also begin at step 815 where a "Greeter" avatar is enabled from FIG. 5, 6 or 7.

If it is determined that an expert is needed to assist a customer, then an "Expert" avatar is requested as the flow continues at step 821. Otherwise, the process continues at step 818, in which the "Greeter" avatar appears to interact with the "Customer" and/or "Friend" avatar. Depending on the nature of the support needs, the customer might request the assistance of an "Expert" avatar at step 819. Using the functions provided by the Routing Server with Virtual World Targets, an available CSR with "Expert" avatar capability is selected in step 820 to join the support session. An "Expert" avatar request is started at step 817. The process for "Expert" avatar assistance is described in reference to FIG. 9.

Figure 9:
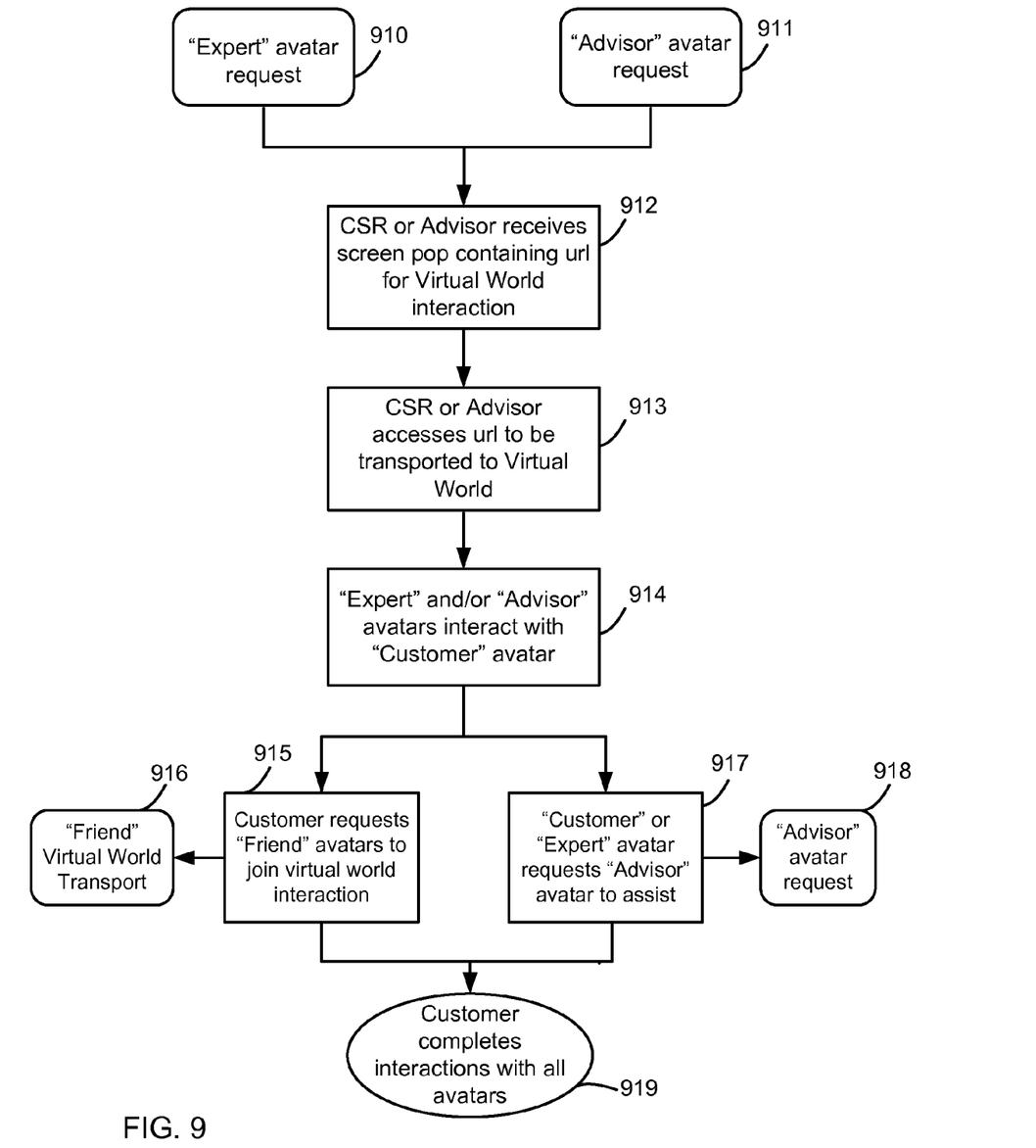
FIG. 9 is a flow chart representing subsequent flows that continue from FIG. 8, in accordance with aspects of the invention.

FIG. 9 is a flow chart representing a process for providing "Expert", "Advisor", and "Friend" avatar assistance in a virtual world, according to the invention. The process begins at step 910 with an "Expert" avatar request from the customer (in FIG. 8) or at step 911 with a "Advisor" avatar request. At step 912, an expert CSR or an advisor (supervisor) in the support center receives a screen pop on their computer with a URL for interacting with a customer in the virtual world. The expert CSR or advisor then accesses the URL in order to be transported to the virtual world at step 913. In the virtual world, the expert CSR and advisor are respectively represented as an "Expert" avatar and a "Advisor" avatar. The "Expert" or "Advisor" avatar, or both, interact with the "Customer" avatar at step 914, leveraging enterprise information and knowledge systems using Virtual World objects and Virtual World chat, VoIP and/or other capabilities. The customer may request one or more "friends" to join the virtual world support session at step 915, with these appearing as "Friend" avatars. The process then enters the "Friend" Virtual World transport at step 916.

While the "Customer", "Expert" and/or "Advisor" avatars interact, they might request the assistance of an "Advisor" avatar per step 917. An "Advisor" avatar represents an advisor in the support center who has more advanced knowledge on the customer issue being resolved than an "Expert" avatar. An "Advisor" avatar request is next initiated at step 918. The interaction among the "Customer", "Greeter", "Expert", "Advisor" and "Friend" avatars completes at step 919.

The subject matter described above is provided by way of illustration only and should not be construed as limiting. Various modifications and substitutions of the described components and operations can be made by those skilled in the art without departing from the spirit and scope of the present invention defined in the following claims, the scope of which is to be accorded the broadest interpretation so as to encompass such modifications and equivalent structures. As will be appreciated by those skilled in the art, the systems, methods, and procedures described herein can be embodied in a programmable computer, computer executable software, or digital circuitry. The software can be stored on computer readable media. For example, computer readable media can include a floppy disk, RAM, ROM, hard disk, removable media, flash memory, a "memory stick", optical media, magneto-optical media, CD-ROM, etc.

What is claimed is:

1. A customer support system comprising:
    a telephone switch for receiving incoming telephone calls for customer service from customers through a public switched telephone network;
    a computer telephony integration (CTI) component for accommodating customer interactions with the customer support system occurring through telephony devices that use phone numbers and through Internet devices that use Internet Protocol addresses;
    a routing server for:
        during an interactive customer service session between one of the customers and the customer support system, routing a customer from a phone, chat, or email based communication to a different virtual world communication without terminating the interactive customer service session, wherein the routing server utilizes the computer telephony integration component to route the phone, chat, or email based communication to the different virtual world communication;
    a web user interface for interacting with a customer through the web during the interactive session;
    a customer support server for providing support to the customer through the web user interface of the different virtual world communication and through an interface of the phone, chat, or email based communication during the interactive customer service session;
    a virtual world component associated with the customer support server for enhancing the interaction between the customer and the customer support server during the interactive customer service session with virtual world features; and
    one or more customer support clients, which are computing devices enabling one or more human agents to provide customer service to the customer during the interactive customer service session, wherein the one or more customer support clients enable the one or more human agents to interact by voice or text for the phone, chat, or email based communications and to interact as an avatar during the virtual world communication using the virtual world component.

2. The system of claim 1, wherein the phone, chat, or email based communication is a phone communication, said system further comprising
    an Interactive Voice Response (IVR) interface for interacting with the customer using a sequence of automated voice prompts, wherein one of the automated voice prompts prompts the customer to interface with a virtual world as part of the different virtual world communication, wherein responsive to the customer selecting to interface with the virtual world, the routing server routes the customer during the interactive customer support from a customer interaction occurring through the telephone device to a customer interaction occurring through the internet device.

3. The system of claim 1, wherein said phone, chat, or email based communication is a chat communication, said system further comprising:
    a chat interface of one of the customer support clients permitting one of the human agents to interact during the interactive customer support session using real time text messages, wherein the router server responsive to receiving an election of the customer to interface with a virtual world as part of the different virtual world communication, routes the customer to engage in the different virtual world communication with one of the human agents, wherein the human agent and the customer both control avatars during the virtual world interaction.

4. The system of claim 1, wherein (responsive to a transfer) the virtual world targets include a "Greeter" avatar for greeting the customer and prompting the customer with support questions.

5. The system of claim 4, wherein the "Greeter" avatar is provided with a prompting script to facilitate the interaction between the customer and the "Greeter" avatar.

6. The system of claim 4, further comprising additional avatars to provide expert assistance to the customer on specific support items.

7. The system of claim 1, further comprising a voice recognition component for recognizing voice input from the customer, and a voice gateway for providing customer support to the customer using a voice device.

8. The system of claim 7, wherein the voice gateway communicates with a public switched telephone network to allow customer support interaction by a telephone.

9. The system of claim 7, further comprising a call management component for managing incoming customer support calls.

10. The system of claim 7, further comprising a voice response-virtual world interaction component for enhancing customer support interaction through the voice device with virtual world features.

11. The system of claim 1, further comprising a knowledge database having customer support information, said knowledge database being accessed from the customer support server.

12. The system of claim 11, wherein the knowledge database includes common customer inquiries and responses corresponding to the inquiries.

13. The system of claim 11, wherein the knowledge database includes information that may be shared with the customer during a support session.

14. The system of claim 1, further comprising an enterprise gateway for integrating other customer support channels, in addition to the web, in the customer support center, said enterprise gateway being in communication with the customer support server.

15. A computer implemented method for providing support to a customer in a virtual world, from a support center enhanced with virtual world features, the method comprising the steps of:
    during an interactive customer service session between a customer and one or more customer service agents, a customer service support system facilitating an interaction between the customer and one of the one or more customer service agents that is a phone, chat, or email based communication;

during an interactive customer service session receiving over the during an interactive customer service session a customer selection to continue the interactive customer service session through a different virtual world communication;

routing the customer to the different virtual world communication without terminating the interactive customer service session;

one of the customer service agents via a customer support client interacting with the customer through a web user interface of a virtual world of the different virtual world communication; and enhancing the virtual world communication with virtual world features provided by a virtual world component coupled to the customer service support system server.

16. The computer implemented method of claim 15, further comprising the step of routing customer support to a customer support representative (CSR) by routing server with virtual world targets to allow the customer to receive support in the virtual world by having an avatar of the customer interact with an avatar of the customer service support system.

17. The computer implemented method of claim 16, wherein the virtual world targets include a "Greeter" avatar for greeting the customer and prompting the customer with support questions.

18. The computer implemented method of claim 15, further comprising the step of interacting with the customer by telephone through a public switched telephone network, said telephone network connected to the support server through a voice gateway.

19. The computer implemented method of claim 18, further comprising the step of enhancing the interaction between the customer and the support center with virtual world features.

20. A computer program product comprising a computer usable storage medium having readable program code embodied in the storage medium, the computer program product includes a component operable to:

during an interactive customer service session between a customer and one or more customer service agents, facilitate via a customer service support system an interaction between the customer and one of the one or more customer service agents that is a phone, chat, or email based communication;

during an interactive customer service session, receive over the during an interactive customer service session a customer selection to continue the interactive customer service session through a different virtual world communication;

route the customer to the different virtual world communication without terminating the interactive customer service session;

interact via a customer support client with the customer through a web user interface of a virtual world of the different virtual world communication; and enhance the virtual world communication with virtual world features provided by a virtual world component coupled to the customer service support system server.

21. The computer program product of claim 20, further comprising a component operable to enable the customer to receive assistance from a customer support representative (CSR) using a routing server with virtual world targets.

22. The computer program product of claim 21, wherein the virtual world targets include a "Greeter" avatar for greeting the customer and prompting the customer with support questions.

23. The computer program product of claim 21, wherein the virtual world targets include avatars to provide expert assistance to the customer on specific support items.

24. The computer program product of claim 20, further comprising a component operable to allow customer interaction by telephone through a public switched telephone network, said telephone network connected to the support server through a voice gateway.

25. The computer program product of claim 24, further comprising a component operable to enhance the voice interaction between the customer and the support server with virtual world features.

* * * * *